(12) United States Patent
Melanson et al.

(10) Patent No.: US 8,716,957 B2
(45) Date of Patent: May 6, 2014

(54) POWERING HIGH-EFFICIENCY LIGHTING DEVICES FROM A TRIAC-BASED DIMMER

(75) Inventors: John L. Melanson, Austin, TX (US); Eric King, Dripping Springs, TX (US)

(73) Assignee: Cirrus Logic, Inc., Austin, TX (US)

( * ) Notice: Subject to any disclaimer, the term of this patent is extended or adjusted under 35 U.S.C. 154(b) by 418 days.

(21) Appl. No.: 13/194,531

(22) Filed: Jul. 29, 2011

(65) Prior Publication Data
US 2012/0025729 A1 Feb. 2, 2012

Related U.S. Application Data

(63) Continuation-in-part of application No. 12/858,164, filed on Aug. 17, 2010, now Pat. No. 8,569,972, and a continuation-in-part of application No. 12/894,440, filed on Sep. 30, 2010.

(60) Provisional application No. 61/369,202, filed on Jul. 30, 2010, provisional application No. 61/410,269, filed on Nov. 4, 2010, provisional application No. 61/437,355, filed on Jan. 28, 2011.

(51) Int. Cl.
*H05B 37/02* (2006.01)
*H05B 41/36* (2006.01)

(52) U.S. Cl.
USPC .......................................... 315/360; 315/291

(58) Field of Classification Search
USPC .................................................. 315/360, 291
See application file for complete search history.

(56) References Cited

U.S. PATENT DOCUMENTS

| | | | |
|---|---|---|---|
| 5,319,301 | A | 6/1994 | Callahan et al. |
| 5,321,350 | A | 6/1994 | Haas |

(Continued)

FOREIGN PATENT DOCUMENTS

| | | |
|---|---|---|
| EP | 1164819 | 12/2001 |
| EP | 2257124 A1 | 1/2010 |

(Continued)

OTHER PUBLICATIONS

Azoteq, IQS17 Family, IQ Switch—ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

(Continued)

*Primary Examiner* — Minh D A
(74) *Attorney, Agent, or Firm* — Mitch Harris, Atty at Law, LLC; Andrew M. Harris

(57) ABSTRACT

A circuit for powering high-efficiency lighting devices from a thyristor-controlled dimmer predicts a zero-crossing time of the AC power line supplying the dimmer and causes a glue impedance to be imposed at the output of the dimmer starting at the time of the zero-crossing, so that the timer in the dimmer will operate properly to generate the turn-on event at the correct time. At turn-on, a lower level of impedance is presented to absorb the energy associated with the turn-on event. A higher level of impedance may be presented after the energy is absorbed until all of the energy needed for the cycle is transferred. Then, a high impedance state is maintained until the next zero-crossing time. The impedance control may be provided by non-uniform operation of a power converter that supplies the lighting devices, or by a combination of non-uniform power converter operation and dissipative loading.

30 Claims, 8 Drawing Sheets

(56) References Cited

U.S. PATENT DOCUMENTS

| | | | |
|---|---|---|---|
| 5,770,928 | A | 6/1998 | Chansky et al. |
| 6,043,635 | A | 3/2000 | Downey |
| 6,091,205 | A * | 7/2000 | Newman et al. ............. 315/194 |
| 6,380,692 | B1 * | 4/2002 | Newman et al. ............. 315/194 |
| 6,713,974 | B2 | 3/2004 | Patcharnik et al. |
| 7,102,902 | B1 | 9/2006 | Brown et al. |
| 7,180,250 | B1 | 2/2007 | Gannon |
| 7,184,937 | B1 | 2/2007 | Su et al. |
| 7,656,103 | B2 | 2/2010 | Shteynberg et al. |
| 7,872,427 | B2 | 1/2011 | Scianna |
| 2007/0182347 | A1 | 8/2007 | Shteynberg |
| 2008/0018261 | A1 | 1/2008 | Kastner |
| 2008/0224629 | A1 | 9/2008 | Melanson |
| 2008/0224633 | A1 | 9/2008 | Melanson |
| 2009/0284182 | A1 | 11/2009 | Cencur |
| 2010/0164406 | A1 | 7/2010 | Kost |
| 2010/0213859 | A1 | 8/2010 | Shteynberg et al. |
| 2011/0080110 | A1 | 4/2011 | Nuhfer et al. |
| 2011/0121754 | A1 | 5/2011 | Shteynberg |
| 2012/0112651 | A1 | 5/2012 | King et al. |
| 2012/0286686 | A1 * | 11/2012 | Watanabe et al. ............. 315/224 |

FOREIGN PATENT DOCUMENTS

| | | |
|---|---|---|
| EP | 2232949 | 9/2010 |
| WO | 2008029108 | 3/2008 |
| WO | 2010011971 A1 | 1/2010 |
| WO | WO 2010035155 A2 | 4/2010 |
| WO | WO 2011008635 A1 | 1/2011 |

OTHER PUBLICATIONS

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, downloaded from www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Why Different Dimming Ranges, 2003, downloaded from http://www.lutron.com/TechnicalDocumentLibrary/LutronBallastpg3.pdf.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

Adrian Z Amanci, et al. "Synchronization System with Zero-Crossing Peak Detection Algorithm for Power System Applications." 2010 IPEC Conference. Jun. 2010. pp. 2884-2991. Publisher: IEEE. Piscataway, NJ, USA.

U.S. Appl. No. 13/537,301, filed Jun. 29, 2012, Melanson, et al.

Engdahl, Tomi, Light Dimmer Circuits, 1997-2000, 9 pages (pp. 1-9 in pdf), dowloaded from www.epanorama.net.

"Why Different Dimming Ranges?", 2003, 1 page, downloaded from http:/ www.lutron.com/TechnicalDocumentLibrary/LutronBallastpg3.pdf.

* cited by examiner

POWERING HIGH-EFFICIENCY LIGHTING DEVICES FROM A TRIAC-BASED DIMMER The present U.S. patent application claims priority under 35 U.S.C. §119(e) to U.S. Provisional Patent Applications Ser. No. 61/369,202 filed on Jul. 30, 2010, Ser. No. 61/410,269 filed on Nov. 4, 2010, and Ser. No. 61/437,355 filed on Jan. 28, 2011. The present U.S. patent application also claims priority under 35 U.S.C. §120 to U.S. patent application Ser. No. 12/858,164 entitled "DIMMER OUTPUT EMULATION", filed on Aug. 17, 2010 and U.S. patent application Ser. No. 12/894,440, entitled "DIMMING MULTIPLE LIGHTING DEVICES BY ALTERNATING ENERGY TRANSFER FROM A MAGNETIC STORAGE ELEMENT", filed on Sep. 30, 2010 each having at least one common inventor and assigned to the same Assignee. The disclosures of both of the above-referenced U.S. patent applications are incorporated herein by reference.

BACKGROUND OF THE INVENTION

1. Field of the Invention

The present invention relates generally to lighting device power sources such as those included within dimmable light emitting diode lamps, and in particular to a lighting device power source that provides proper operation of a triac-based dimmer while powering high-efficiency lighting devices.

2. Background of the Invention

Lighting control and power supply integrated circuits (ICs) are in common use in both electronic systems and in replaceable consumer lighting devices, e.g., light-emitting-diode (LED) and compact fluorescent lamp (CFL) replacements for traditional incandescent light bulbs.

In particular, in dimmable high-efficiency replacement light bulbs, the low energy requirements of the lighting devices makes it difficult for the dimmers to operate properly, as the typical triac-controlled dimmer is designed for operation with a load that requires on the order of ten times the current required by the typical high-efficiency lighting device. Therefore, dimmable high-efficiency replacement lighting device circuits must ensure that the dimmer operates properly in conjunction with the lighting devices, i.e., supplies a sufficient amount of energy and provides a needed indication of the dimming level, so that dimming of the lighting devices can be performed.

Therefore, it would be desirable to provide a dimmable high-efficiency lighting device power source circuit that provides proper operation of a triac-based dimmer circuit.

SUMMARY OF THE INVENTION

The invention is embodied in a circuit for supplying power to high efficiency lighting devices from a thyristor-controlled dimmer circuit, an IC including such a circuit and a method of operation of the circuit.

The circuit includes a circuit that determines or predicts a zero-crossing time of the AC power line supplying the dimmer. By predicting the zero-crossing time, a glue impedance level can be presented at the output of the thyristor-controlled dimmer circuit, so that the timer in the thyristor-controlled dimmer is operated properly while the thyristor is off.

In another aspect of the invention, a low impedance is presented immediately after a turn-on time of the thyristor-controlled dimmer circuit, by controlling operation of a power converter that transfers energy from the dimmer to the lighting devices so that the power converter non-uniformly transfers more energy for a period after the turn-on time to absorb the energy associated with the turn-on of the thyristor. The non-uniform operation can also be combined with dissipative loading. The low impedance presented after turn-on prevents early termination of the thyristor's "on" period due to resonance. The power converter may be a two-stage converter so that excess energy needed to maintain the loading operation can be stored until needed during a later cycle. A high impedance is presented after energy has been transferred until a predicted next zero-crossing time of the AC power line, preventing false triggering of the thyristor in the dimmer circuit.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for powering and controlling lighting devices. In particular embodiments, strings of light-emitting diodes (LEDs) are packaged to replace incandescent lamps, and the energy supplied to the LED strings is varied in accordance with a dimming value determined from operation of a thyristor-controlled dimmer supplying the replacement lighting device, so that dimmed operation is achieved. The present invention achieves dimming operation efficiently without mis-firing of the thyristor in the dimmer by various features that are described in further detail below.

Figure 1:
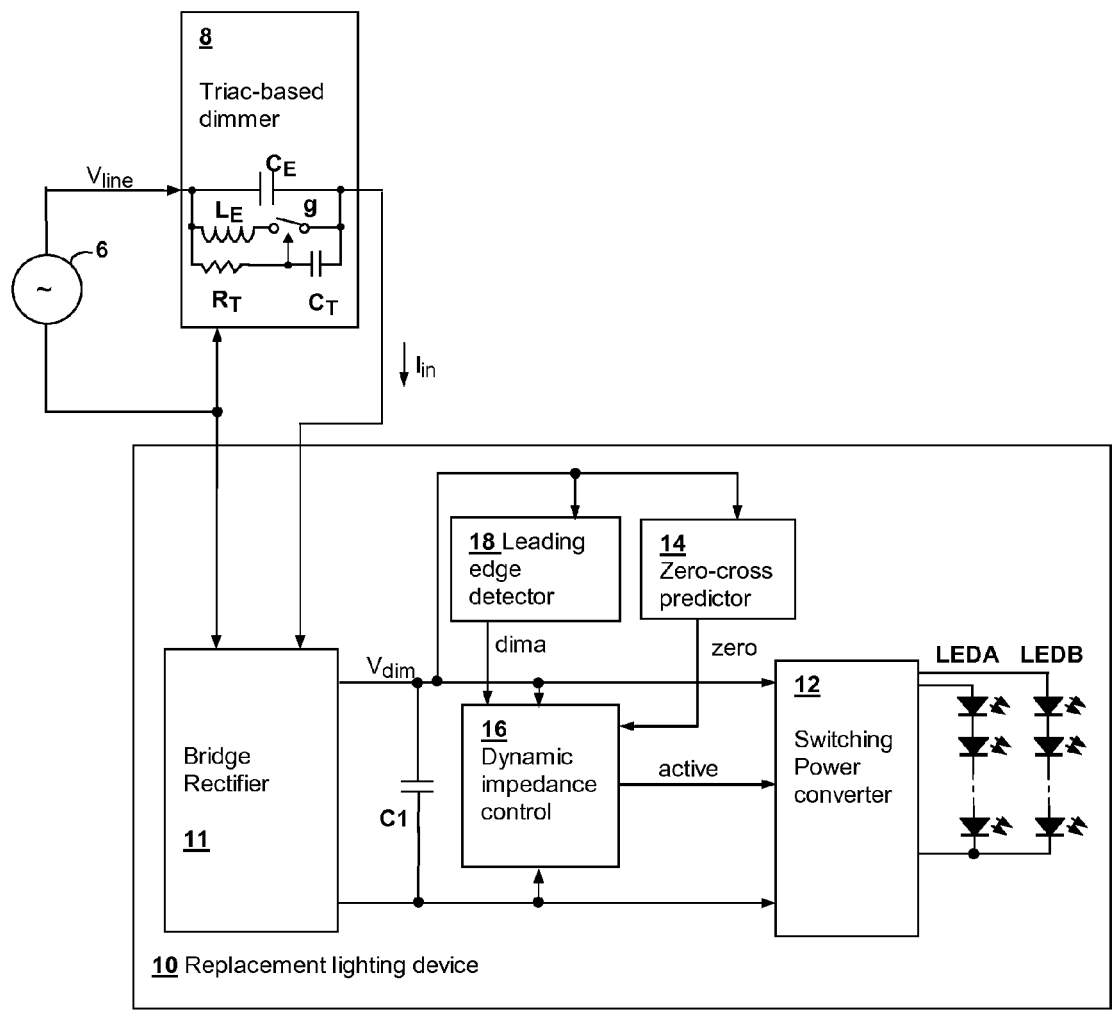
FIG. 1 is a block diagram depicting a lighting circuit in accordance with an embodiment of the present invention.

Referring now to FIG. 1, a lighting circuit in accordance with an embodiment of the invention is shown. An AC power line source 6 provides an AC line voltage $V_{line}$ to a replacement lighting device 10 through a triac-based dimmer 8 that is, for example, designed for operation with incandescent bulbs having a power consumption of 40 W or greater. Replacement lighting device 10 uses LEDs LEDA, LEDB, to supply light, which may be strings of LEDs connected in series, as shown. Since even a 100 W equivalent high-efficiency replacement bulb using LEDs consumes only 13 W of power, the current level of an LED replacement lamp will be less than ⅓ of that conducted through the minimum specified wattage incandescent bulb, and may be as low as ¹⁄₁₀th the current. Therefore, the triac in triac-based dimmer 8 can fail to trigger properly due to the reduced current conducted through the triac at the time triac-based dimmer 8 turns on.

Also, the timing circuit that triggers the triac in triac-based dimmer can turn on the triac at the wrong time unless the proper conditions are present at the output of triac-based dimmer 8 from the time of the zero-crossing of AC line voltage $V_{line}$ until the triac in triac-based dimmer 8 is triggered. Further, if the operation of replacement lighting device 10, which contains a switching power converter 12 is not somehow coordinated with the cut sine wave of rectified dimmer output voltage $V_{dim}$, then switching power converter 12 may not receive all of the energy needed to supply LEDs LEDA, LEDB for the cycle. Switching power converter 12 may also improperly re-trigger triac-based dimmer 8 if a low impedance is suddenly introduced at the output of triac-based dimmer 8 by starting another active cycle of switching power converter 12 after triac-based dimmer 8 has turned off for the current cycle.

Within the block depicting triac-based dimmer 8, a model equivalent circuit is shown that is useful for describing the operation of the triac and timing circuits within an actual triac-based dimmer. The switch g illustrates operation of the triac itself, which alternately conducts current $I_{in}$ between AC power line source 6 and replacement lighting device 10.

Initially, when switch g is open, EMI capacitor $C_E$ and the timing circuit formed by timing resistor $R_T$ and timing capacitor $C_T$ charge through the load applied at the output terminal of triac-based dimmer 8, which in ordinary operation is typically an incandescent bulb of 40 W or greater power consumption. Once capacitor $C_T$ is charged to a threshold voltage magnitude, switch g closes (i.e., the gate of the triac is triggered) and AC line voltage $V_{line}$ is provided to the output of triac-based dimmer through an inductor $L_E$, which is provided for EMI filtering and to reduce lamp buzz (acoustic noise in an incandescent filament). Once switch g is closed, switch g remains closed (i.e., the triac continues to conduct) until the magnitude of current $I_{in}$ conducted through triac-based dimmer 8 falls below the hold current of the triac. However, if an insufficiently low-impedance load is connected to the output of the triac, the stored energy from capacitor $C_E$, which has been dumped into inductor $L_E$, will return to capacitor $C_E$ as the parallel combination of capacitor $C_E$ and inductor $L_E$ begins to oscillate. When the current through inductor $L_E$ falls below the hold current of the triac, the triac will turn off.

In order to prevent the above-described mis-triggering triac-based dimmer 8, replacement lighting device 10 includes a dynamic impedance control circuit 16 that, upon detection of a rise in rectified dimmer output voltage $V_{dim}$ caused by a turn-on event of triac-based dimmer 8, applies a damping impedance level that is sufficient to prevent the re-triggering of the triac in triac-based dimmer 8 by damping the resonant circuit formed by capacitor $C_E$ and inductor $L_E$. The impedance at the input of replacement lighting device 10 is maintained at or below the requisite damping impedance level until a predetermined time period has passed. The requisite damping impedance level varies with the particular triac design, but is generally between 100 ohms and 1 kOhm. After the predetermined time period has passed, replacement lighting device 10 only needs to draw enough current to maintain the triac-based dimmer in a conducting state while energy needed to supply LEDs LEDA, LEDB for the cycle is being transferred. The minimum current required to maintain the conducting state is the hold current of the particular triac in triac-based dimmer 8, which is generally between 25 and 70 milliamperes. Replacement lighting device then enters a high impedance state, disabling switching power converter 12 so that a sudden change in impedance due to activation of switching power converter 12 does not trigger triac-based dimmer 8 by re-charging capacitor $C_T$ to the trigger threshold during any remaining portion of the half-cycle of AC line voltage $V_{line}$ for which the corresponding triac output cycle already been terminated.

In order to ensure that the next leading edge of the output of triac-based dimmer 8 occurs at the correct time, proper operation of the timer circuit formed by capacitor $C_T$ and resistor $R_T$ must be provided. At the time the next zero-crossing of AC line voltage $V_{line}$ occurs, and from that time until triac-based dimmer 8 turns on, a path for the input current $I_{in}$ that is charging timing capacitor $C_T$ must be provided at the input of replacement lighting device. Further, the impedance must be low enough to not generate a voltage drop across the inputs of replacement lighting device 10 that would substantially affect the trigger point of the triac, e.g., the time at which switch g closes. In order to prevent the above-described mis-operation of triac-based dimmer 8, replacement lighting device 10 includes a zero-cross prediction circuit 14 that predicts or detects a zero-cross time of AC line voltage $V_{line}$ by observing dimmer output voltage $V_{dim}$, and dynamic impedance control circuit 16 ensures that a sufficiently low "glue" impedance is presented at the input terminals of replacement lighting device from the zero-cross time until the turn-on event is detected by leading edge detection circuit 18. The glue impedance needed to ensure proper timing is generally an impedance substantially equal to 100 ohms or less. Such an impedance, if present across the dimmer output terminals during the active phase of triac-based dimmer, would require power transfer or dissipation on the order of that caused by a 100 W light bulb, but since the glue impedance is applied while the triac is off, the power transfer is only that required to operate the timer circuit formed by capacitor $C_T$ and resistor $R_T$.

Figure 2:
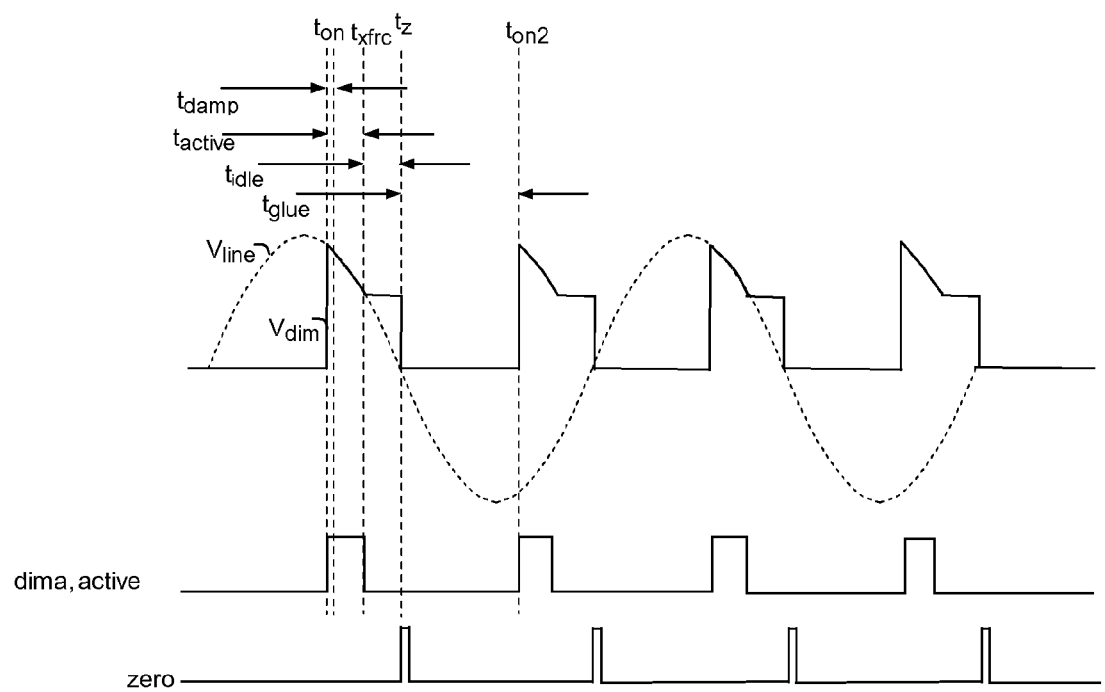
FIG. 2 is a signal waveform diagram illustrating the various phases of operation of lighting circuits in accordance with embodiments of the present invention.

Referring now to FIG. 2, the various phases of operation of replacement lighting device 10 are illustrated with reference to cycles of AC line voltage $V_{line}$ and the cut sine waveforms of rectified dimmer output voltage $V_{dim}$. During a predetermined time period $t_{damp}$ immediately following the triac turn-on event at time $t_{on}$, the damping impedance level is presented by operation of dynamic impedance control 16, when leading edge detector 18 detects the triac turn-on event and asserts control signal dima. At least a portion of the damping impedance can be provided by operation of switching power converter 12 which operates during time period $t_{active}$ beginning just after time $t_{on}$. In the depicted embodiment, control signal active, which is provided to switching power converter 12 to indicate to switching power converter 12 both when to start an energy transfer cycle, and how long the cycle may potentially extend, i.e., the maximum duration of the active cycle is the duration of the high-state pulse of control signal active. Once the possibility of resonant re-triggering of the triac has been avoided, e.g., after the energy associated with the turn-on event has been dissipated or stored for operating LEDs LEDA, LEDB, while energy is still needed by switching power converter 12 for the present cycle of AC line voltage $V_{line}$, transfer of energy is performed by switching power converter 12, and the current through triac-based dimmer 8 is maintained at or above the level of the hold current required by the triac in triac-based dimmer 8 throughout the remainder of active time period $t_{active}$. After the energy transfer is complete at time 17 the input of $t_{xfrc}$, the input of replacement lighting device 10 enters a high-impedance state during idle time interval $t_{idle}$. Then, once zero-crossing prediction circuit 14 indicates, by asserting control signal zero that a zero-crossing of AC line voltage $V_{line}$ is occurring, dynamic impedance control 16 asserts the glue impedance at the output of triac-based dimmer 8, so that the timer circuit in triac-based dimmer 8 formed by capacitor $C_T$ and resistor $R_T$ will charge properly and generate the next leading edge of dimmer output voltage $V_{dim}$ at the proper time $t_{on2}$. At time $t_{on2}$, the damping impedance level is again asserted at the input of replacement lighting device 10.

Figure 3A:
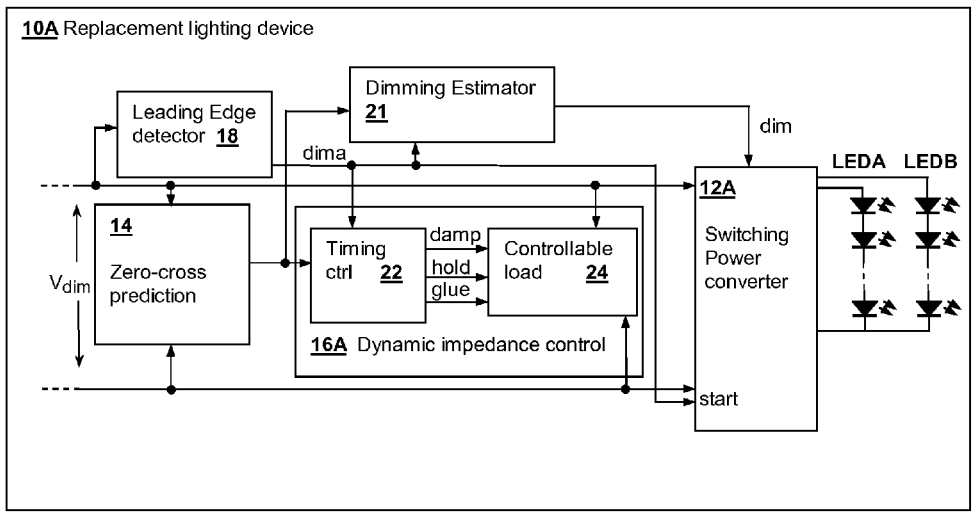
FIGS. 3A-3C are block diagrams of replacement lighting devices that can be used in the lighting circuit of FIG. 1 in accordance with various embodiments of the present invention.

Referring to FIG. 3A, an exemplary replacement lighting device 10A is shown in accordance with an embodiment of the present invention, and which may be used in the lighting circuit of FIG. 1. Replacement lighting device 10A controls the impedance presented at input terminals IN using a controllable load 24, which may be a controllable current sink, a resistor having a series-connected switching transistor, or other suitable circuit for shunting current across the output of triac-based dimmer 8. While shunting current through a dissipative load such as controllable load 24 wastes energy, depending on the energy requirements of LEDs LEDA and LEDB, it may be necessary to provide some form of dissipative loading in order to ensure proper triac operation in triac-based dimmer 8. Controllable load 24 is triggered by control signal dima, provided from an output of leading edge detector 18, which indicates to a timing control circuit 22, when to apply the damping impedance, selected by control signal damp. After the predetermined damping period has expired, e.g. at 100 uS, timing control circuit 22 de-asserts control signal damp and asserts control signal hold, which sets the minimum holding impedance to maintain the triac in the conducting state. In the depicted embodiment of replacement lighting device 10A, the holding impedance is not terminated early even if switching power converter 12A has completed energy transfer, so that the timer formed by capacitor $C_T$ within triac-based dimmer 8 charges properly and generates the next leading edge of dimmer output voltage $V_{dim}$, at the correct time. Embodiments of the invention that include idle periods are illustrated in further detail below.

Zero-cross prediction circuit 14 provides control signal zero to dynamic impedance control 16A, which causes timing circuit 22 to assert control signal glue, which in turn commands controllable load 24 to apply the glue impedance level across the input terminals, in order to provide proper operation of the timer in triac-controlled dimmer 8. Zero-cross prediction circuit 14 determines a location of the zero-crossings of AC line voltage $V_{line}$ from rectified dimmer output voltage $V_{dim}$, i.e., the voltage across input terminals IN. Since rectified dimmer output voltage $V_{dim}$ is not a sine wave both due to the leading edge cut, and also due to idle phases in some embodiments of the invention, zero-cross prediction circuit 14 uses either analog techniques, such as multiple threshold comparators to trigger waveshape generators, e.g., a parabolic waveform generator that provides a close approximation to a sinusoidal waveshape, or digital techniques such as an analog-to-digital converter (ADC) with a processing block that can extrapolate the zero crossing location from the shape of the cut sine waveform of dimmer output voltage $V_{dim}$. Such a digital circuit does not require complexity, since even a very low resolution ADC can be used to predict the zero-crossing location and generate control signal zero. A phase lock loop (PLL) can alternatively be used to predict the zero-crossing location by performing phase comparisons with the rectified dimmer output voltage $V_{dim}$ and a reference timer clock output.

A dimming estimator 21 is also included within replacement lighting device 10A and receives input from zero-cross predictor 14 and leading edge detector 18. Dimming estimator determines dimming value dim from the time periods between a zero-crossings of AC line voltage $V_{line}$ and the time that triac-based dimmer 8 turns on in the next cycle of AC line voltage $V_{line}$. Further details of dimmer waveform prediction and dimmer value determination are disclosed in the above-incorporated U.S. patent application entitled "DIMMER OUTPUT EMULATION", as well as in the U.S. Provisional Patent Application Ser. No. 61/410,269, which is incorporated herein by reference.

Switching power converter 12A is synchronized with the waveform of AC line voltage $V_{line}$ by control signal dima, which is provided to the start input of switching power converter 12A, ensuring that the energy transfer cycle from input terminal IN through switching power converter 12A occurs at the leading edge of the cut sine waveform of rectified dimmer output voltage $V_{dim}$. Once all of the energy needed for a given half-cycle has been transferred, power converter 12A stops transferring energy and will not start again until receiving another pulse at input start. Timing control circuit 22 can optionally terminate the half-cycle of the rectified dimmer output voltage $V_{dim}$, by raising the impedance of controllable load 24 to the high impedance state in response to a feedback signal from switching power converter 12A, generating an idle phase of operation. When zero-cross predictor 14 indicates that a zero-crossing of AC line voltage $V_{line}$ is occurring, timing control circuit 22 asserts control signal glue to apply the glue impedance level across the output of triac-controlled dimmer 8.

Figure 3B:
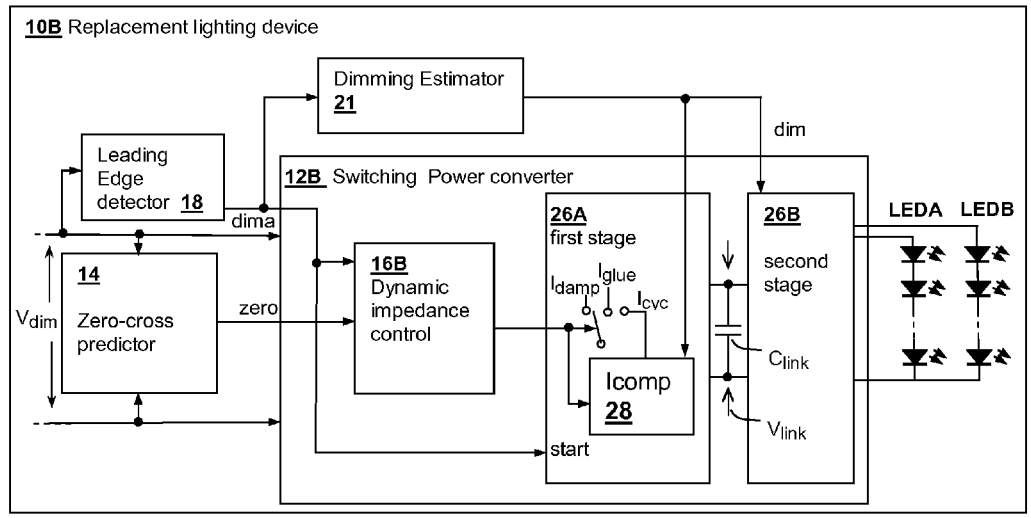

Referring now to FIG. 3B, an exemplary replacement lighting device 10B is shown in accordance with another embodiment of the present invention, and which may alternatively be used in the lighting circuit of FIG. 1. Replacement lighting device 10B is similar to replacement lighting device 10A of FIG. 3A, so only differences between the circuits will be described below. Replacement lighting device 10B controls the impedance presented at the output of triac-based dimmer 8 by operating a switching power converter 12B in a non-uniform manner. A dynamic impedance control circuit 16B is included within switching power converter 12B, and receives control signal dima from leading edge detector 18 and control signal zero from zero-cross predictor circuit 14. Dynamic impedance control circuit 16B provides one or more control signals to a first stage 26A of switching power converter 12B, which force the current transferred by first stage 26A to assume at least a minimum current level $I_{damp}$ during damping time period $t_{damp}$, and a minimum glue current level $I_{glue}$ during the time period $t_{glue}$, as illustrated in the timing of FIG. 2. A current computation block ($I_{comp}$) 28 determines the remainder (if any) current needed to complete the required transfer of energy for the current cycle, which is also based the present dimming value dim, since dimming value dim indicates how much energy will be needed to supply LEDs LEDA, LEDB from a second stage of switching power converter 26B and the duration of the active cycle of the output of triac-based dimmer 8, which determines the maximum time period first stage 26A could transfer energy, if needed. A link capacitor $C_{link}$ provides intermediate storage between first stage 26A and second stage 26B, so that first stage 26A can be operated at higher current levels (lower impedance levels) during the initial portion of the active portion of rectified dimmer output voltage $V_{dim}$ as described above and at lower current levels during the remainder of the active portion of the cycle, without causing second stage 26B to fall short of energy needed for transfer to LEDs LEDA, LEDB. Therefore, link voltage $V_{link}$ will generally vary across the half-cycle of the AC line voltage $V_{line}$ to store a greater amount of energy during the beginning of the cycle.

Figure 3C:
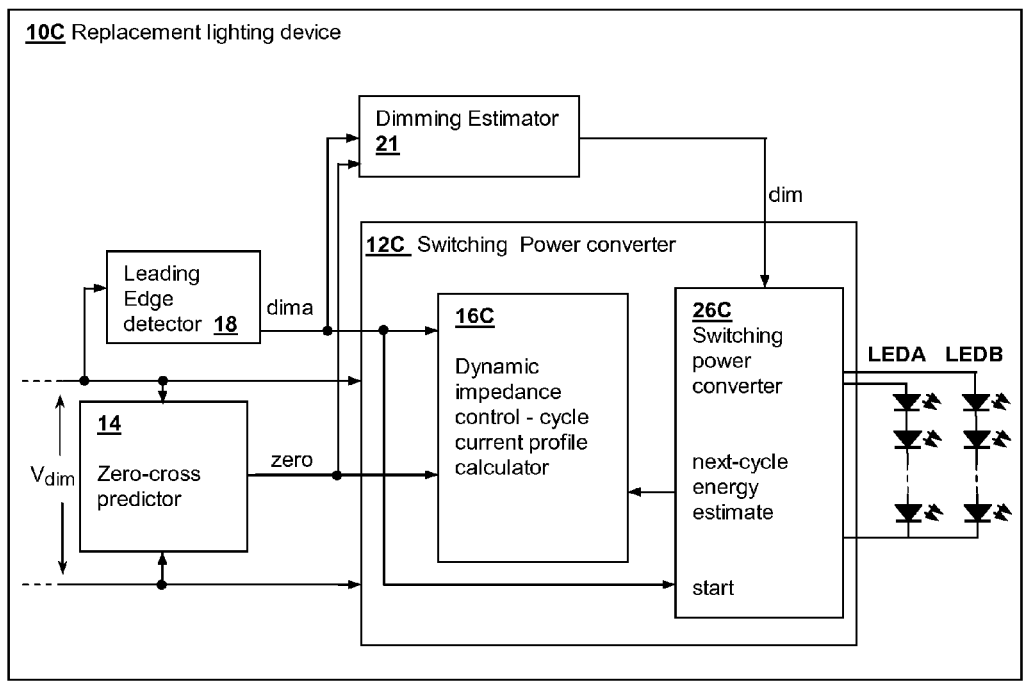

Referring now to FIG. 3C, an exemplary replacement lighting device 10C is shown in accordance with another embodiment of the present invention, and which may alternatively be used in the lighting circuit of FIG. 1. Replacement lighting device 10C is similar to replacement lighting device 10B of FIG. 3B, so only differences between the circuits will be described below. In replacement lighting device 10C, a switching power converter 12C includes a dynamic impedance control and cycle current profile calculator block 16C that receives a next-cycle energy estimate from switching power converter 26C and uses the required minimum glue and hold impedances and their associated time periods in conjunction with the next cycle energy requirements to compute a current profile for controlling switching power converter 12C. When control signal dima is asserted, switching power converter 12C transfers energy to the output, or to a link capacitor in a multi-stage implementation as shown in FIG. 3B, according to the generated current profile.

Figure 4:
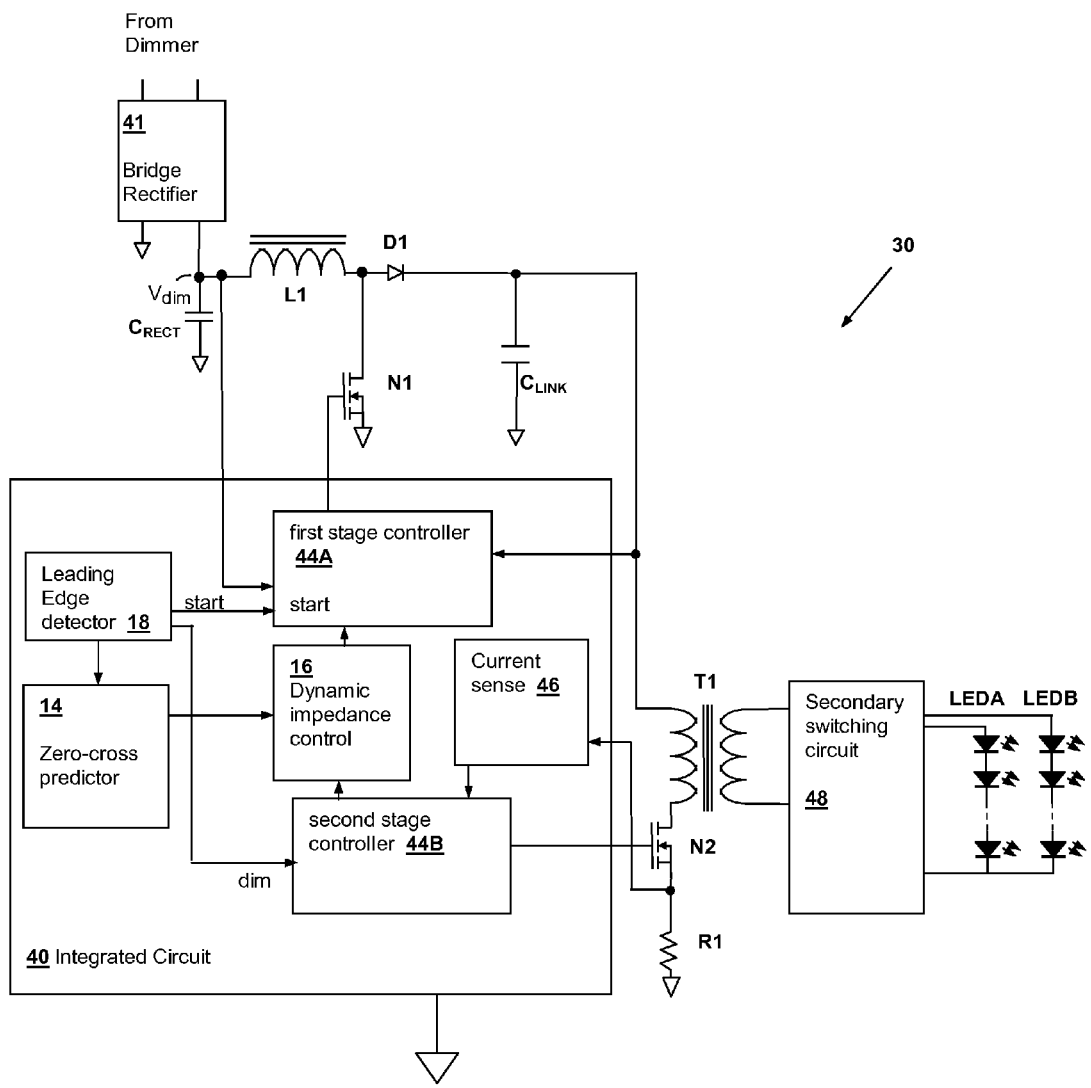
FIG. 4 is a simplified schematic diagram of a lighting circuit in accordance with another embodiment of the present invention.

Referring now to FIG. 4, a lighting circuit 30 in accordance with an embodiment of the present invention is shown. The circuit of FIG. 4 is provided to illustrate details of a two-stage switching power converter that may be used to implement switching power converters 26A-26C, as illustrated in FIGS. 3A-3C, respectively. The output of a dimmer is provided to a bridge rectifier 41 that generates a rectified dimmer output voltage $V_{dim}$. A capacitor $C_{RECT}$ provides filtering of higher frequency switching components generated by a buck input stage implemented by inductor L1, switching transistor N1, diode D1 and capacitor $C_{LINK}$. A resistor R1 provides for current-sensing of the primary current provided through transistor N2. An integrated circuit 40 provides control of transistor N1 from a first stage controller 44A and further controls a flyback converter stage from a second stage controller 44B that switches transistor N2 to provide current through a transformer T1 in response to feedback provided from current sensing circuit 46. Second stage controller provides information about energy requirements to dynamic impedance control circuit 16, which provides control indication to first stage controller 44A to dynamically control the impedance presented at the input terminal that receives the output of bridge rectifier 41, thereby controlling the impedance presented to the output of triac-controller dimmer 8. Zero-cross predictor 14 and leading edge detector 18 operate as described above for the various embodiments of the invention illustrated in FIGS. 3A-3C. Current for operating LEDs LEDA, LEDB may be supplied through a secondary switching circuit 48 that alternates application of the secondary current between LED strings, which may be of different color in order to provide a color profile that varies with the dimming value dim or under other control input. First stage controller 44A is activated by control signal zero as illustrated in the above-described embodiments of FIGS. 3A-3C, and the lighting circuit illustrated in FIG. 4 can be used to implement the embodiments of the invention depicted in FIGS. 3A-3C. Further details for supplying multiple strings of LEDs from a single secondary winding are disclosed in the above-incorporated U.S. patent application entitled "DIMMING MULTIPLE LIGHTING DEVICES BY ALTERNATING ENERGY TRANSFER FROM A MAGNETIC STORAGE ELEMENT."

Figure 5A:
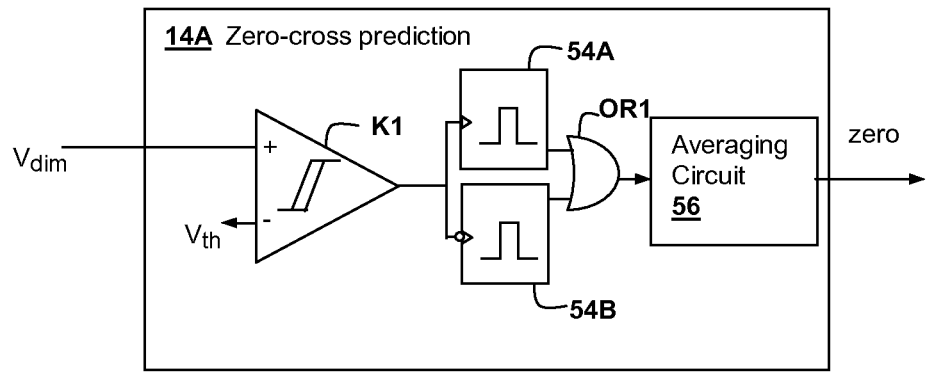
FIGS. 5A-5B are block diagrams of zero-cross determining circuits in accordance with alternative embodiments of the invention.

Referring now to FIG. 5A, a zero-cross detection circuit 14A as may be employed in the above-described embodiments of the invention is shown. A hysteresis comparator K1 detects when rectified dimmer output voltage $V_{DIM}$ exceeds threshold voltage $V_{th}$, and one-shots 54A and 54B generate pulses that are combined by logical-OR gate OR1 to provide a pulse at each zero-crossing of AC line voltage $V_{line}$. An averaging circuit 56, such as a digital processing block or PLL, is included to reconstruct the input AC line voltage $V_{line}$ phase from the rectified dimmer output voltage $V_{DIM}$, which may be accomplished as described in the above-incorporated U.S. patent application entitled "DIMMER OUTPUT EMU-LATION." The output of zero-cross prediction circuit 14A is a pulse that is asserted at the end of each half-cycle of AC line voltage $V_{line}$, and indicates to one of the above-described circuits, when to apply the glue impedance or current level at the output of triac-based dimmer circuit 8.

Figure 5B:
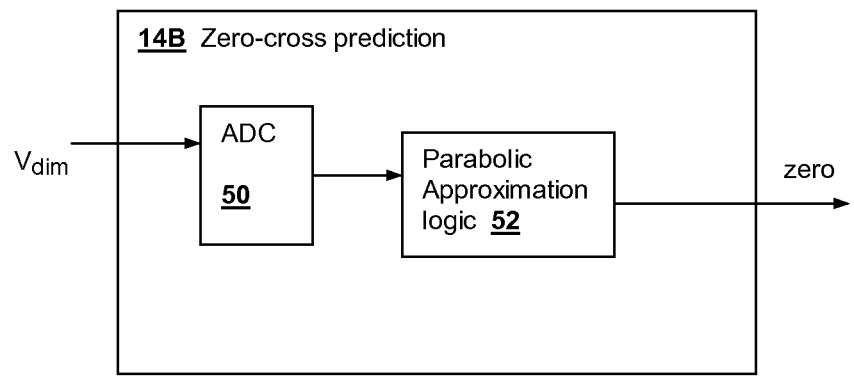

Referring now to FIG. 5B, a zero-cross prediction circuit as may be employed in the above-described embodiments of the invention is shown. An ADC 50 provides input to parabolic approximation logic 52 that generates control signal zero according to the predicted location of the zero-crossings of AC line voltage $V_{line}$. ADC 50 may be replaced by a pair of comparator and parabolic approximation logic 52 may be replaced by an analog circuit that performs piecewise approximation to approximate the waveshape of AC line voltage $V_{line}$ from the cut sine wave shape of rectified dimmer output voltage $V_{dim}$.

Figure 6A:
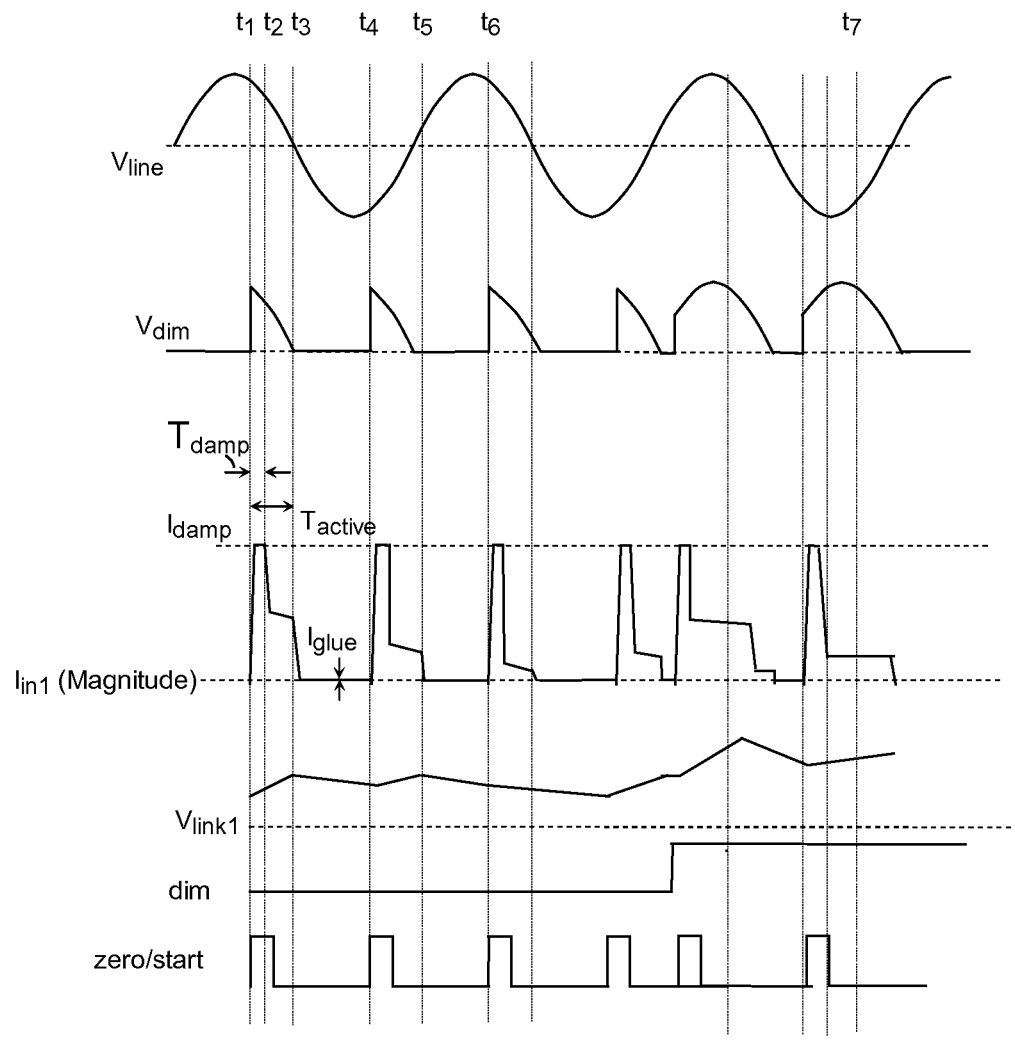
FIGS. 6A-6B are signal waveform diagrams illustrating signals within lighting circuits in accordance with embodiments of the present invention.

Referring now to FIG. 6A, signals within the above-described embodiments of the invention are shown in a signal waveform diagram. At time $t_1$, a leading edge of rectified dimmer output voltage $V_{dim}$ indicates a triac turn-on event and for time period $t_{damp}$, a greater current level of at least $I_{trip}$ is drawn from the output terminals of triac-based dimmer 8 of FIG. 1. Current waveform $I_{in1}$ corresponds to an input current drawn by replacement lighting device 10A of FIG. 3A or replacement lighting device 10B of FIG. 3B, having discrete and substantially constant values during the different portions of the half-cycle of AC line voltage $V_{line}$ between times $t_1$ and $t_2$, i.e. low-impedance interval $T_{damp}$ and the remainder of the active cycle of dimmer output voltage $V_{dim}$ between time $t_2$ and time $t_3$, during which a different impedance level/current draw is applied. Transitions in current waveform $I_{in1}$ cannot be too abrupt, or oscillation of EMI inductor $L_E$ and EMI capacitor $C_E$ can result, causing the triac to turn off at the wrong time. Voltage waveform $V_{link1}$ corresponds to link voltage $V_{link}$ when charged by the input stage of replacement lighting device 10A of FIG. 3A or replacement lighting device 10B of FIG. 3B. Between time $t_3$ and time $t_4$, the glue impedance or glue current level, is applied to the output of triac-based dimmer 8. Since the current is actually determined by the timer in the triac-based dimmer 8, the actual shape of the current will vary as the current passing through the timer circuit formed by capacitor $C_T$ and resistor $R_T$ as shown in FIG. 1. Therefore, the value of $I_{glue}$ is not generally constant, but is shown here as a minimum level to indicate that the inputs of the replacement lighting device is not in a high impedance state during the glue interval $T_{glue}$.

Figure 6B:
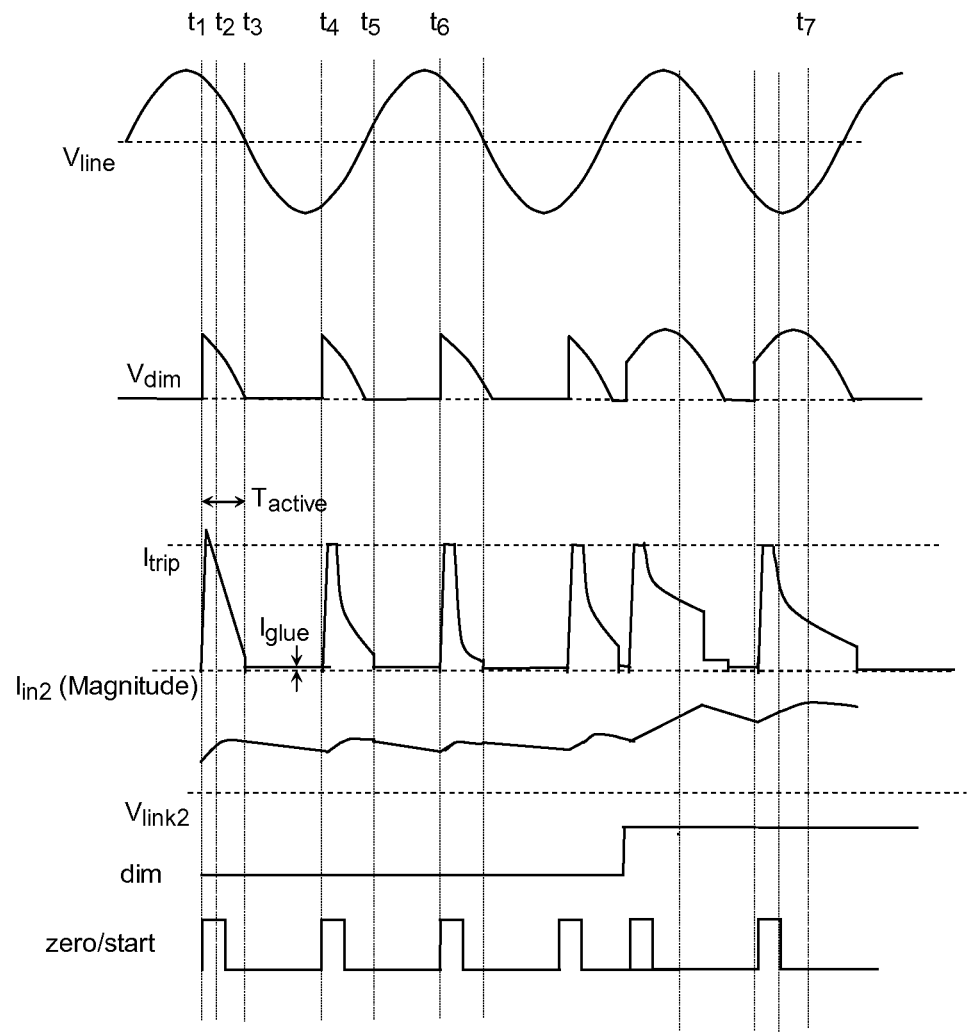

Referring now to FIG. 6B, a signal waveform diagram depicting signals within lighting circuits described above according to other embodiments of the invention. Current waveform $I_{in2}$ corresponds to an input current drawn by replacement lighting device 10C of FIG. 3C, in which a continuously changing current profile may be drawn from the output of triac-based dimmer 8 of FIG. 1. Voltage waveform $V_{link2}$ corresponds to link voltage $V_{link}$ when charged by the input stage of replacement lighting device 10C of FIG. 3C. In all of the above-described waveforms, energy is transferred from the output of triac-based dimmer 8 during an energy transfer time period $T_{active}$, which extends from leading-edge time $t_1$ until the end of the active period of triac-based dimmer 8, although in some circumstances, and in some embodiments, energy transfer will terminate before the end of the active period of triac-based dimmer 8, by lowering input current $I_{in}$ below the value of the hold current of the triac in triac-based dimmer 8. For example, in replacement lighting device 10A of FIG. 3A, since a dissipative load is available to extend the active triac cycle beyond the time at which sufficient energy has been transferred by switching power converter 12A, the actual energy transfer may be terminated earlier. Also, in some embodiments of the invention, it may not be necessary to extend the energy transfer period across the entire active cycle of triac-based dimmer, so that the active cycle is actually terminated by the replacement lighting device 10 of FIG. 1, ceasing current draw from the output of triac-based dimmer.

In both FIG. 6A and FIG. 6B, the cycles commencing at times $t_4$ and $t_5$ illustrate a decreasing need for energy transfer, as link voltage $V_{link1}$ and $V_{link2}$ increase in magnitude. Because replacement lighting device 10C uses a computed current profile, current $I_{in2}$ is shaped, except at the ends of each active interval and during the glue intervals. However, at time $t_7$, such a case is illustrated, due to a rising value of link voltage $V_{link2}$ and an active period dimmer output voltage $V_{dim}$ that is near maximum. Similarly, at time $t_7$ in FIG. 6A, current $I_{in1}$ illustrates a case that may be necessary when the level of energy transfer is so great for a period that voltage $V_{link1}$ would rise too high without terminating the active period of triac-based dimmer 8.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A circuit for powering one or more lighting devices from an output of a thyristor-switched dimmer circuit, comprising:
   a power converter having an input for coupling to the output of the thyristor-switched dimmer circuit and at least one output for supplying energy to the one or more lighting devices;
   a control circuit having an input coupled to the output of the zero-crossing predicting circuit for determining an active time period for which the power converter transfers energy from the output of the thyristor-switched dimmer circuit, wherein subsequent to the active time period, a high impedance level is presented to the output of the thyristor-switched dimmer circuit during an idle period;
   a zero-crossing predicting circuit for calculating a zero-cross time of a voltage of an AC power source coupled to an input of the thyristor-switched dimmer circuit; and
   a timer coupled to the zero-crossing predicting circuit for triggering application of a glue impedance level to the output of the thyristor-switched dimmer circuit to terminate the idle period at a time substantially equal to the zero-cross time.

2. The circuit of claim 1, wherein the control circuit controls operation of the power converter to apply the glue impedance level such that the glue impedance level is presented to the output of the thyristor-switched dimmer circuit until at least all of the energy required by the one or more lighting devices for a present cycle of the thyristor-switched dimmer circuit has been transferred to an output of the power converter.

3. The circuit of claim 1, wherein the power converter comprises:
   a first power converter stage having an input coupled to the output of the thyristor-switched dimmer circuit;
   a link capacitor coupled to an output of the first power converter stage; and
   a second power converter stage having an input coupled to the capacitor for transferring energy from the link capacitor to the one or more lighting devices.

4. The circuit of claim 3, wherein first power converter stage is coupled to the control circuit so that the control circuit controls the first power converter stage to transfer energy during the active period to charge the link capacitor in excess of the energy transferred from the second power converter stage to the one or more lighting devices during at least a portion of a power line cycle of the AC power source.

5. The circuit of claim 1, further comprising a load circuit for dissipating energy provided from the output of the thyristor-switched dimmer circuit during the active time period, wherein the control circuit controls the load circuit to provide the glue impedance level at the output of the thyristor-switched dimmer circuit.

6. The circuit of claim 1, wherein the zero-cross predicting circuit is a circuit that computes the zero-cross time of the voltage of the AC power source from a waveshape of the voltage at the output of the thyristor-switched dimmer circuit during the active time period.

7. The circuit of claim 1, wherein the zero-cross predicting circuit and the timer form part of a phase-lock loop that that calculates the zero-cross time of the voltage of the AC power source from phase comparisons of multiple periods of the AC power source with a phase of the timer.

8. A method of powering one or more lighting devices from an output of a thyristor-switched dimmer circuit, comprising:
   supplying energy to the one or more lighting devices by converting energy drawn from the output of the thyristor-switched dimmer circuit;
   determining an active time period for which the power converter transfers energy from the output of the thyristor-switched dimmer circuit;
   controlling an impedance presented to the output of the thyristor-switched dimmer circuit such that a higher impedance is presented to the output of the output of the thyristor-switched dimmer circuit during an idle period immediately subsequent to the active time period;
   predicting a zero-cross time of a voltage of an AC power source coupled to an input of the thyristor-switched dimmer circuit; and
   responsive to the predicting, applying a glue impedance level to the output of the thyristor-switched dimmer circuit to terminate the idle period at a time substantially equal to the zero-cross time.

9. The method of claim 8, wherein the controlling controls operation of the converting such that the glue impedance level is presented to the output of the thyristor-switched dimmer circuit until at least all of the energy required by the one or more lighting devices for a present cycle of the thyristor-switched dimmer circuit has been converted.

10. The method of claim 8, wherein the converting comprises:
    storing the energy drawn from the output of the thyristor-switched dimmer circuit in a link capacitor in a first converting stage; and
    transferring energy from the link capacitor to the one or more lighting devices by a second converting stage.

11. The method of claim 10, wherein the first converting stage transfers energy during the active period to charge the link capacitor in excess of the energy transferred by the second converting stage to the one or more lighting devices during at least a portion of a power line cycle of the AC power source.

12. The method of claim 8, further comprising dissipating energy provided from the output of the thyristor-switched dimmer circuit during the active time period through a loading circuit, wherein the controlling controls the loading circuit to apply the glue impedance level at the output of the thyristor-switched dimmer circuit during the active time period.

13. The method of claim 8, wherein the predicting computes the voltage of the AC power source from a waveshape of the voltage at the output of the thyristor-switched dimmer circuit during the active time period.

14. The method of claim 8, wherein the predicting is performed by a phase-lock loop that that calculates the zero-cross time of the voltage of the AC power source from phase comparisons of multiple periods of the AC power source with a phase of the timer.

15. An integrated circuit for operating a circuit that powers one or more lighting devices from an output of a thyristor-switched dimmer circuit, comprising:
   a power converter control circuit having an input for coupling to the output of the thyristor-switched dimmer circuit and an output for controlling a power converter for supplying the one or more lighting devices from the output of the thyristor-switched dimmer circuit;
   an impedance control circuit having an input coupled to the output of the zero-crossing predicting circuit for determining an active time period for which the power converter transfers energy from the output of the thyristor-switched dimmer circuit, wherein subsequent to the active time period, a high impedance level is presented to the output of the thyristor-switched dimmer circuit during an idle period;
   a zero-crossing predicting circuit for calculating a zero-cross time of a voltage of an AC power source coupled to an input of the thyristor-switched dimmer circuit; and
   a timer coupled to the zero-crossing predicting circuit for triggering application of a glue impedance level to the output of the thyristor-switched dimmer circuit to terminate the idle period at a time substantially equal to the zero-cross time.

16. The integrated circuit of claim 15, wherein the impedance control circuit controls operation of the power converter control circuit to apply the glue impedance level such that the glue impedance level is presented to the output of the thyristor-switched dimmer circuit until at least all of the energy required by the one or more lighting devices for a present cycle of the thyristor-switched dimmer circuit has been transferred by the power converter.

17. The integrated circuit of claim 15, wherein the power converter control circuit controls a two cascaded power converter stages coupled by a link capacitor that stores energy converter by a first one of the power converter stages from the output of the thyristor-switched dimmer circuit and wherein a second one of the power converter stages is controlled by the power converter control circuit to transfer energy from the link capacitor to the one or more lighting devices.

18. The integrated circuit of claim 17, wherein the power converter control circuit controls the first power converter stage to transfer energy during the active period to charge the link capacitor in excess of the energy transferred from the second power converter stage to the one or more lighting devices during at least a portion of a power line cycle of the AC power source.

19. The integrated circuit of claim 15, further comprising a load circuit for dissipating energy provided from the output of the thyristor-switched dimmer circuit during the active time period, wherein the impedance control circuit controls the load circuit to provide the glue impedance level at the output of the thyristor-switched dimmer circuit.

20. The integrated circuit of claim 15, wherein the zero-cross predicting circuit is a circuit that computes the zero-cross time of the voltage of the AC power source from a waveshape of the voltage at the output of the thyristor-switched dimmer circuit during the active time period.

21. The integrated circuit of claim 15 wherein the zero-cross predicting circuit and the timer form part of a phase-lock loop that that calculates the zero-cross time of the voltage of the AC power source from phase comparisons of multiple periods of the AC power source with a phase of the timer.

22. A circuit for powering one or more lighting devices from an output of a thyristor-switched dimmer circuit, comprising:
   a power converter having an input for coupling to the output of the thyristor-switched dimmer circuit;
   a zero-crossing determining circuit for determining a zero-cross time of a voltage of an AC power source coupled to an input of the thyristor-switched dimmer circuit; and
   a control circuit having an input coupled to the output of the zero-crossing determining circuit for controlling operation of the power converter such that a greater amount of current is drawn from the thyristor-switched dimmer circuit through the power converter commencing at a first time substantially equal to a turn-on time of the thyristor-switched dimmer circuit than a lesser non-zero amount of current that is transferred commencing at a second time subsequent to the first time and prior to a next zero-cross time of the voltage of the AC power source.

23. The circuit of claim 22, wherein a portion of the energy required for operation of the one or more lighting devices is transferred during a first time period extending from the turn-on time to the first time, wherein a remaining portion of the energy required for operation of the one or more lighting devices is transferred during a second time period extending from the first time to the second time, and wherein no energy is transferred during a third time period extending from the second time to a next zero-cross time.

24. The circuit of claim 22, wherein the control circuit determines a profile of operation of the power converter for a next cycle of the AC power source and controls the power converter in conformity therewith so that a minimum specified value of current is drawn from the turn-on time to the first time and any remaining energy required by the one or more lighting devices is transferred during a time period extending from the first time until the second time.

25. A method of powering one or more lighting devices from an output of a thyristor-switched dimmer circuit, comprising:
   determining a zero-cross time of a voltage of an AC power source coupled to an input of the thyristor-switched dimmer circuit;
   supplying energy to the one or more lighting devices by converting energy drawn from the output of the thyristor-switched dimmer circuit using a power converter; and
   controlling the power converter such that a greater amount of current is drawn from the thyristor-switched dimmer circuit through the power converter commencing at a first time substantially equal to a turn-on time of the thyristor-switched dimmer circuit than a lesser non-zero amount of current that is transferred commencing at a second time subsequent to the first time and prior to a next zero-cross time of the voltage of the AC power source.

26. The method of claim 25, wherein a portion of the energy required for operation of the one or more lighting devices is transferred by the supplying during a first time period extending from the turn-on time to the first time, wherein a remaining portion of the energy required for operation of the one or more lighting devices is transferred by the supplying during a second time period extending from the first time to the second time, and wherein no energy is transferred by the supplying during a third time period extending from the second time to a next zero-cross time.

27. The method of claim 25, wherein the controlling comprises:
   determining a profile of operation of the power converter for a next cycle of the AC power source; and
   controlling the supplying in conformity therewith so that a minimum specified value of current is drawn from the turn-on time to the first time and any remaining energy required by the one or more lighting devices is transferred by the supplying during a time period extending from the first time until the second time.

28. An integrated circuit for operating a circuit that powers one or more lighting devices from an output of a thyristor-switched dimmer circuit, comprising:
   a zero-crossing determining circuit for determining a zero-cross time of a voltage of an AC power source coupled to an input of the thyristor-switched dimmer circuit; and
   a power converter control circuit having an input for coupling to the output of the thyristor-switched dimmer circuit and an output for controlling a power converter for supplying the one or more lighting devices from the output of the thyristor-switched dimmer circuit, wherein the power converter control circuit controls operation of the power converter such that a greater amount of current is drawn from the thyristor-switched dimmer circuit through the power converter commencing at a first time substantially equal to a turn-on time of the thyristor-switched dimmer circuit than a lesser non-zero amount of current that is transferred commencing at a second time subsequent to the first time and prior to a next zero-cross time of the voltage of the AC power source.

29. The integrated circuit of claim 28, wherein the power converter control circuit controls the power converter so that a portion of the energy required for operation of the one or more lighting devices is transferred during a first time period extending from the turn-on time to the first time, wherein a remaining portion of the energy required for operation of the one or more lighting devices is transferred during a second time period extending from the first time to the second time, and wherein no energy is transferred during a third time period extending from the second time to a next zero-cross time.

30. The circuit of claim 28, wherein the power converter control circuit determines a profile of operation of the power converter for a next cycle of the AC power source and controls the power converter in conformity therewith so that a minimum specified value of current is drawn from the turn-on time to the first time and any remaining energy required by the one or more lighting devices is transferred during a time period extending from the first time until the second time.

* * * * *